United States Patent
Berlin et al.

(10) Patent No.: US 10,163,195 B2
(45) Date of Patent: Dec. 25, 2018

(54) SPATIO-TEMPORAL DIFFERENTIAL SYNTHESIS OF DETAIL IMAGES FOR HIGH DYNAMIC RANGE IMAGING

(71) Applicants: Andrew Berlin, Lexington, MA (US); Rajeev Surati, Cambridge, MA (US)

(72) Inventors: Andrew Berlin, Lexington, MA (US); Rajeev Surati, Cambridge, MA (US)

( * ) Notice: Subject to any disclaimer, the term of this patent is extended or adjusted under 35 U.S.C. 154(b) by 0 days.

(21) Appl. No.: 14/968,762

(22) Filed: Dec. 14, 2015

(65) Prior Publication Data
US 2017/0352131 A1    Dec. 7, 2017

Related U.S. Application Data

(60) Provisional application No. 62/091,217, filed on Dec. 12, 2014.

(51) Int. Cl.
| | | |
|---|---|---|
| G06K 9/00 | (2006.01) | |
| G06T 5/00 | (2006.01) | |
| G06T 5/50 | (2006.01) | |
| H04N 5/232 | (2006.01) | |
| H04N 5/235 | (2006.01) | |

(52) U.S. Cl.
CPC .............. *G06T 5/001* (2013.01); *G06T 5/50* (2013.01); *H04N 5/2355* (2013.01); *H04N 5/23222* (2013.01); *G06T 2207/10024* (2013.01); *G06T 2207/10028* (2013.01); *G06T 2207/10144* (2013.01); *G06T 2207/10148* (2013.01); *G06T 2207/20208* (2013.01); *G06T 2207/20221* (2013.01); *G06T 2207/20224* (2013.01)

(58) Field of Classification Search
CPC .. G06T 5/001; G06T 5/20; G06T 5/40; G06T 5/50; G06T 7/001; G06F 17/30249; G06K 9/6407; G06K 9/2009; G06K 9/6423; H04N 5/23222; H04N 5/2355
See application file for complete search history.

(56) References Cited

U.S. PATENT DOCUMENTS

| | | | | |
|---|---|---|---|---|
| 4,760,541 | A * | 7/1988 | Weygandt | G06T 5/20 382/103 |
| 8,964,998 | B1 * | 2/2015 | McClain | H03G 3/32 381/106 |
| 2006/0018566 | A1 * | 1/2006 | Coleman | G06K 9/0063 382/312 |
| 2007/0165925 | A1 * | 7/2007 | Ahn | G01S 7/52033 382/128 |
| 2008/0285853 | A1 * | 11/2008 | Bressan | G06T 5/009 382/169 |
| 2010/0014781 | A1 * | 1/2010 | Liu | H04N 13/0022 382/285 |
| 2015/0379740 | A1 * | 12/2015 | Yang | G06T 5/50 348/222.1 |
| 2017/0270375 | A1 * | 9/2017 | Grauer | G06K 9/00805 |

* cited by examiner

*Primary Examiner* — Amir Alavi
(74) *Attorney, Agent, or Firm* — Richard Ben Amster

(57) ABSTRACT

An image acquisition apparatus configured to receive an adjustable image acquisition parameter, wherein said parameter is adjusted based on an image that has had its subject selectively enhanced via comparison with at least one background reference image.

34 Claims, 13 Drawing Sheets

SPATIO-TEMPORAL DIFFERENTIAL SYNTHESIS OF DETAIL IMAGES FOR HIGH DYNAMIC RANGE IMAGING

This application claims the benefit of U.S. provisional patent application 62/091,217, filed Dec. 12, 2014 entitled "Spatio-Temporal Differential Synthesis of Detail Images for High Dynamic Range Imaging." which is incorporated herein in its entirety by reference.

FIELD OF THE INVENTION

The invention generally relates to Spatio-Temporal Differential Synthesis of Detail Images For High Dynamic Range Imaging.

BACKGROUND

Camera Parameter Adjustment

Consider imaging of the face of a person seated in a stationary vehicle with tinted windows on a bright day, as illustrated in FIG. 1. The subject contributes only a very small portion of the light present at each pixel in the image, making the subject difficult or impossible to discern in captured images. Typically, such a difficult-to-discern subject would be largely ignored by automatic camera parameter selection algorithms such as auto-focus, auto-exposure, white balance, and so forth, which would instead target edges of the vehicle, edges of the window, the window coloring itself, or images of objects that are being reflected by the window such as clouds and blue sky reflecting off of an automobile windshield. FIG. 1 shows a typical unprocessed image acquired using the automatic exposure, automatic white balance, and automatic-focus features of an iPhone 5S.

This invention differs from existing camera parameter adjustment algorithms in that it applies the parameter adjustment based on the qualities of the enhanced subject image, such as auto-focusing on the nearly-hidden subject's face.

Tonal Mapping

Image enhancement via tone-mapping, including techniques such as white-balancing, brightness enhancement, contrast enhancement, color-correction, intensity-level shifting and so forth, are well known in the literature. Applying these techniques to an image captured through a semi-transparent, semi-reflective, semi-absorptive material will adjust the subject image, but will also adjust the many other light components that form the complex mixture of light that arises when images are captured in such challenging settings. In many situations, especially for subjects imaged in the presence of bright reflections, and in backlit situations, these well-known techniques do not produce high-quality, or even readily visible, images of the subject.

For example, FIG. 2 shows the result of increasing the brightness and contrast of the image from FIG. 1. Note how in addition to light from the subject of interest, light from many other sources that is also present at each pixel is amplified as well. The person's face becomes slightly visible, but is unrecognizable due to the enhanced reflection of the building and sky. This adjustment of non-subject light limits the effectiveness of traditional tone adjustment techniques as a means to enhance images for which the subject represents only a small portion of the light present at each pixel.

This invention differs from traditional tone-mapping approaches in that this invention applies tone-mapping preferentially to light from the subject relative to light from other sources.

HDR Photography

High-dynamic range (HDR) photography techniques, which typically combine multiple different exposures of a scene, have proven to be helpful in providing added tonal detail in low-lit areas (where a longer-exposure image would typically be used), while simultaneously permitting detail to be shown without saturation in brightly-lit areas (where a shorter-exposure time image would typically be used). Combining portions of multiple images enables the HDR approach to achieve greater detail in a single image than would otherwise be possible, and can permit combinations of features that would otherwise not be visible in any single image to become visible in the composite image.

This invention differs from the traditional HDR approach in two ways:

Creating and combining synthetic images that preferentially enhance the subject relative to the background based on spatio-temporal spectral intensity changes.

Combining subimages from different moments in time at which each enhanced subject is most visible.

Please see FIG. 3 for a basic example of a HDR image created by merging a traditionally-exposed image with an enhanced-subject image.

SUMMARY OF THE INVENTION

Glare, reflections, and tinted glass pose major challenges when capturing images. Particularly when images are acquired through semi-transparent, semi-reflective, semi-absorptive materials such as tinted windows, it can often be very difficult or even impossible to see the subject of interest due to the intermixing, at the pixel-level, of light from the subject with light being reflected off of the window, light associated with window coloration, and glare from light sources (such as backlighting by the sun). Thus tinted windows, one-way mirrors, sunglasses, and even bright backlighting do indeed provide some degree of privacy. Making subjects that are obscured by these factors be more visible poses an unsolved challenge for image enhancement technology.

Imaging a subject that contributes only a tiny portion of the light captured at each pixel is extremely challenging. This invention addresses this challenge by introducing techniques that identify and preferentially enhance light received from the subjects of interest, relative to light received from other light sources. A novel combination of image subtraction, space-time-based filtering, high-dynamic-range tonal mapping, and image compositing are used to synthesize enhanced subject images. Additionally, methods are introduced that utilize the resulting enhanced subject image to provide feedback that further improves the image acquisition process, enabling adjustment of image acquisition parameter settings such as focus, aperture, exposure time, and color balance based on the enhanced subject image.

Light associated with an object being imaged typically contains a combination of a reflectance component, corresponding to the innate color of that object (such as a gray piece of glass), and an illumination component (is the object in shadow, in a blue spot light, etc.). Light impinging on a material is partially absorbed, partially transmitted, and partially reflected. Thus acquiring imagery of a subject of interest through semi-transparent, semi-reflective, semi-absorptive materials is highly complex, because the light acquired by the camera includes multiple mixed components:

The 'subject', i.e. light associated with the material that comprises the object of interest, such as the face of a person sitting in a vehicle behind a tinted windshield.

The 'true background', i.e. objects or light sources that lie behind the subject, such as seat upholstery or light entering from a rear window of a vehicle that is being photographed through the front windshield.

The 'reflection background', which includes light from the reflectance component of the semi-transparent material itself (such as the color of a tinted window), light resulting from the illumination pattern reflecting off of the semi-transparent material (such as an image of the sky reflecting off of an automobile windshield), and intensity gradients imparted on the semi-transparent material by illumination features such as shadows.

Additionally, light associated with the subject is modified as it passes through the semi-transparent material due to the transmissive optical properties of the semi-transparent material, such as a spatially-graduated window tint.

This invention introduces several novel aspects:
a. An apparatus architecture that achieves selective enhancement of subject light relative to reflection background light and true background light, including a data flow architecture that utilizes subtractive processing, selective level-shifting, amplification, and tone correction to make the subject image more visible.
b. A novel asymmetric temporal differencing approach that distinguishes 'reflection background' light from 'true background' light.
c. An illumination modulation apparatus that facilitates distinguishing reflection background light from true background light and subject light.
d. Adjustment of image acquisition parameters such as focus based on the enhanced subject light.
e. Generation of a high dynamic range composite image by combining enhanced subject images with traditionally-acquired images.
f. Use of range information to inhibit corruption of the visual models by ignoring out-of-range light components.

DETAILED DESCRIPTION

Figure 1:
FIG. 1 illustrates a typical unprocessed image acquired using the automatic exposure, automatic white balance, and automatic-focus features of an iPhone 5S.
Figure 2:
FIG. 2 illustrates the result of increasing the brightness and contrast of the image from FIG. 1.
Figure 3:
FIG. 3 shows an example of a HDR image created by merging a traditionally-exposed image with an enhanced-subject image.
Figure 4:
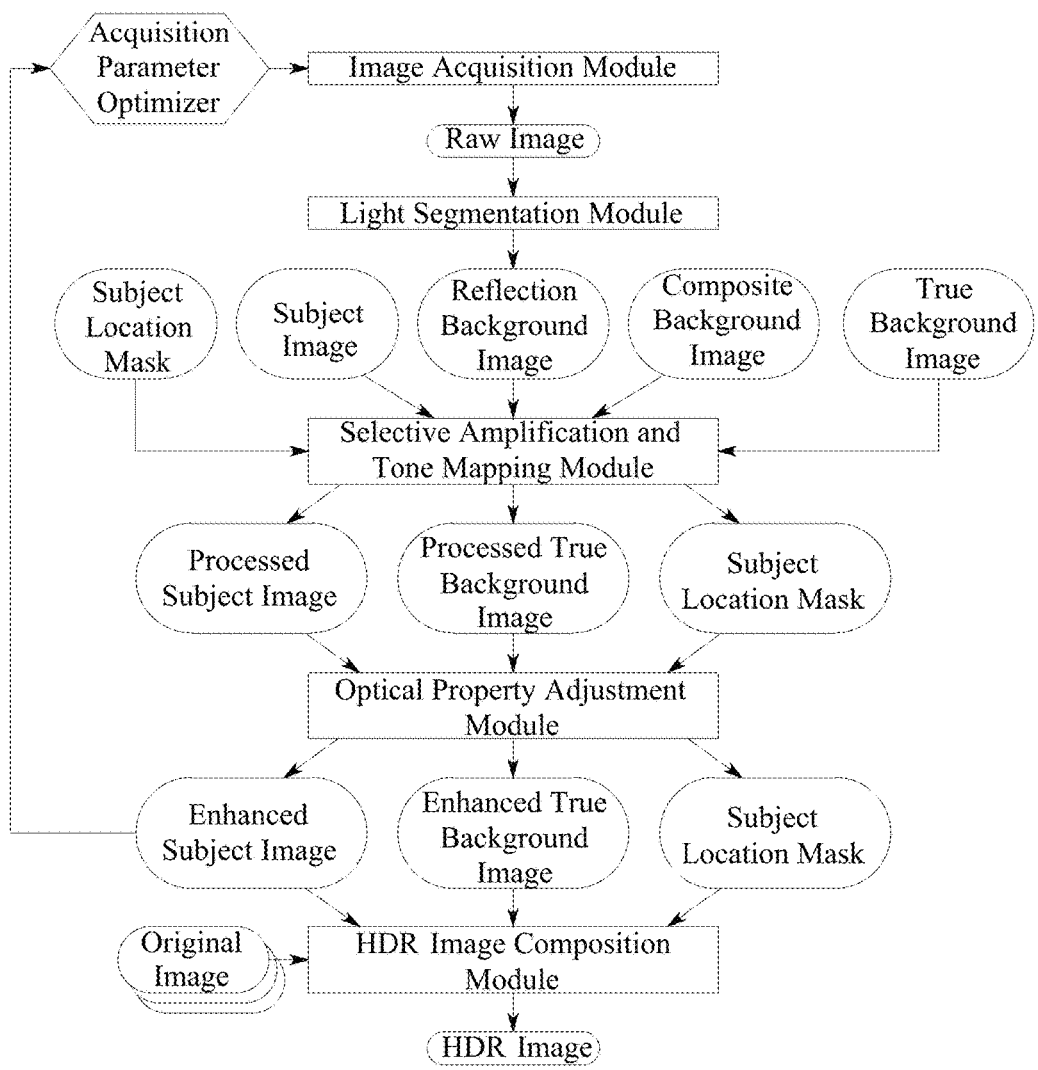
FIG. 4 shows a Data Flow Diagram

This invention extends the high dynamic-range approach to the domain of spatio-temporal filtering and transparent layer separation, introducing the concept that rather than (or in addition to) combining images having different exposure conditions to form a High Dynamic Range image, one or more synthetic images are combined. Each synthetic image is created using a combination of temporal and spatial operations that preferentially emphasize light arising from the subject relative to light that is due to other sources. Preferential enhancement is achieved by segmenting the image into multiple layers, some of which are transparent, and then isolating, amplifying, and level-shifting the layer and spatio-temporal region that corresponds to the subject. These synthetic images are then combined with one another and optionally with portions of traditionally-acquired images, to create a composite high dynamic range image. The overall data flow is illustrated in FIG. 4.

The Light Segmentation Module

Figure 5:
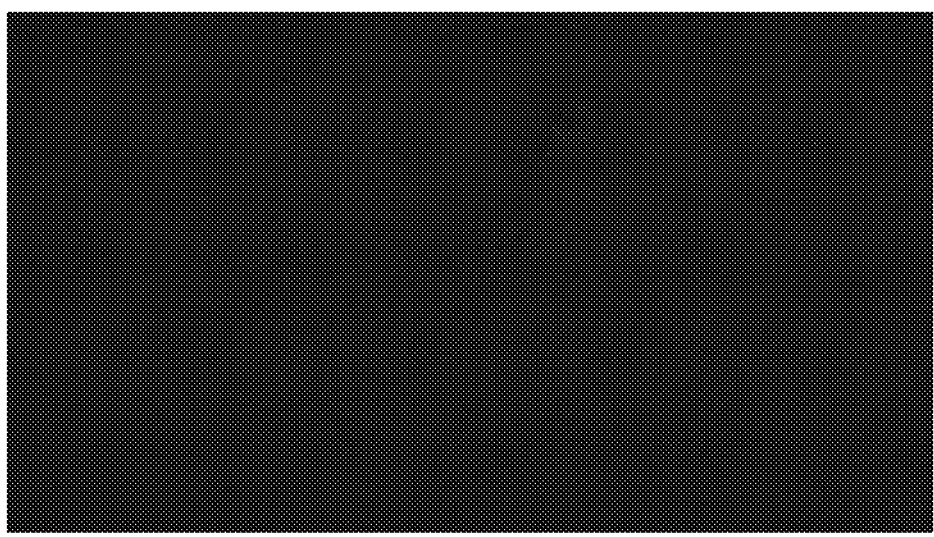
FIG. 5 shows a subject layer image derived from this invention's advanced light segmentation algorithm.

The goal of the Light Segmentation Module is to separate the light associated with the subject from the light associated with the true background and the reflected background. FIG. 5 illustrates the results of a light segmentation algorithm disclosed in this invention, to be described in detail later. Note that light segmentation alone is not nearly sufficient to make the subject readily visible.

Although the bright reflection background and true background have been removed, the subject is not readily visible.

The Selective Amplification and Tone-Mapping Module

Figure 6:
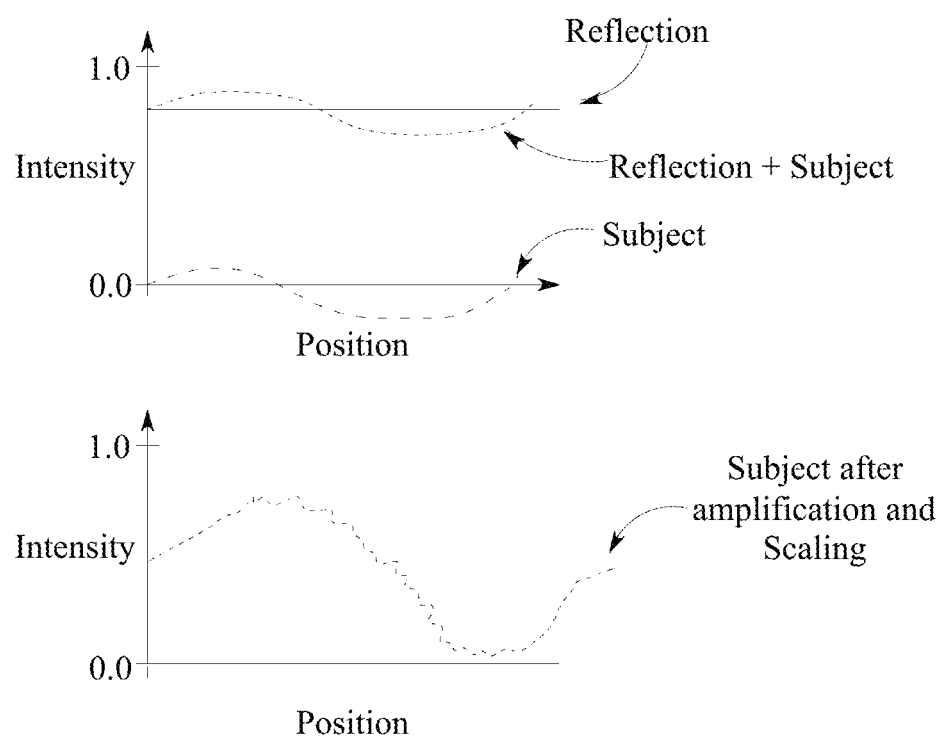
FIG. 6: Why additional processing beyond image segmentation is required.

The goal of the amplification and tone-mapping module is to selectively amplify the subject image. As illustrated in FIG. 6, further adjustment of the subject image is required because when imaging an object with a bright 'reflection background' component, the changes in image intensity associated with the subject are a very small fraction of the overall light that reaches each pixel. So even after the reflection background component has been removed, both the magnitude and the range of the subject image's pixel values remain quite small in comparison to the overall range of pixel intensities that were present in the original image. To make the subject visible, a combination of level shifting, amplification, and tone correction is desirable.

The subject image signal resulting from image segmentation is extremely small, as it was just a small fraction of the 'reflection+subject' signal that was captured by the camera. Even with the 'reflection' component removed, the subject signal is still very weak, and in many cases will contain negative intensity values. Tonal mapping, including scaling and level shifting, is required to make the subject more visible.

This invention goes beyond traditional transparent layer segmentation by performing amplification, level shifting, and/or tone adjustment on the subject image, and then using the resulting enhanced-subject image as input to an HDR compositing process.

Figure 7:
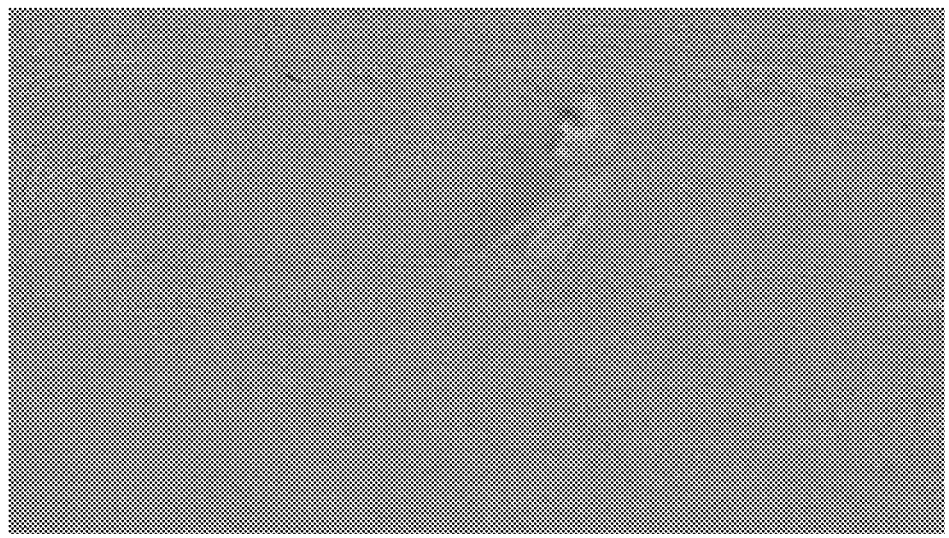
FIG. 7: The result of amplifying the image intensities of the subject image shown in FIG. 5 by a factor of 80×.

In a preferred embodiment, the image is amplified and then level-shifted upwards so that its minimum value is 0. FIG. 7 shows results for an alternative embodiment, in which the subject layer intensities are amplified by a factor of 80× but no color tone correction or contrast enhancement is performed.

Figure 8:
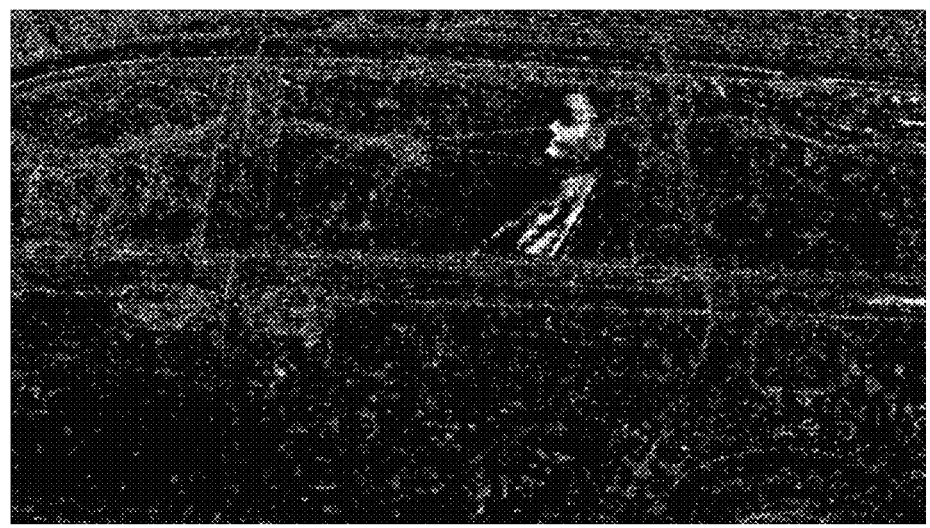
FIG. 8 shows the result of applying a diamond-shaped spatial mask to the image shown in FIG. 7.

Applying spatial operations and thresholding to the subject image can further refine which pixels should be amplified and which should be ignored. For example, since a person's face is rarely only one pixel in size, a spatial thresholding mask can be used to remove isolated pixels. FIG. 8 shows the result of applying a diamond-shaped spatial mask to the image shown in FIG. 7. Note how visibility of the subject's face is clearly improved. Spatio-temporal filtering may be applied directly to the subject image, or in a preferred embodiment, may be informed by the 'true background' and 'reflection background' images as well. Specifically, thresholding the absolute value of the difference between the subject image and the 'true background' image can further refine the location of the subject by identifying locations where the subject occludes the 'true background'. Applying selective amplification and tone correction to the subject image locations only, in regions where this difference from 'true background' exceeds a threshold, is a preferred embodiment of this invention.

The Optical Property Adjustment Module

The goal of the optical property adjustment module is to correct color shifts, spatial distortions, and other effects of light passing through a semi-transparent surface such as a piece of tinted glass. For instance, in the case of a window with a known tint gradient of a particular color, the color of the subject image would be shifted to compensate for the color-shift and intensity-shift introduced by the window at each location in the image. The magnitude of this color-shift and intensity shift may be measured directly, for instance by placing a calibrated color card within the vehicle in front of the subject, and observing the difference in the subject image relative to the ideal known coloration of the card. Alternatively, the magnitude of this color-shift and intensity shift may be known in advance, such as by knowing the make and model of a vehicle and looking-up what the factory-provided window tint is. A database may be used to look-up the optical transmission properties of the glass used in a window or vehicle, such as the percent tint and spatial tint gradient. Object identification techniques, or simple human-input (mouse-clicking on the corners of the windshield, for instance), may then be used to identify the boundaries of the window, from which the optical properties at each pixel can then be derived based on the known spatial gradient of the glass. If optical transmission properties are not available, the user can be presented with several possible correction settings, corresponding to common products likely to be encountered, and can choose among them based on preferred appearance of the enhanced subject image.

Optical property adjustment may be advantageously applied to just the subject image, or to both the subject and the 'true background' image and/or 'reflection background' image, depending on the needs of the application. For instance, to image an outdoor scene using an indoor camera through a tinted window, it would be desirable to perform optical property adjustment on the 'true background' as well as on the 'subject', so that the scene background is corrected for the window tint color. However, it would not be desirable to perform optical property adjustment on the 'reflection background', since the 'reflection background' would typically represent indoor light sources that it is not desirable to include in the resulting HDR image.

Figure 9:
FIG. 9 shows a Subject image, intensity enhanced, masked, and selectively mixed with original frame based on mask.

FIG. 9 shows a subject image, intensity enhanced, masked, and selectively mixed with original frame based on mask.

Feedback to Image Acquisition Module

Images produced by the amplification and tone-mapping module, as well as images produced by the optical property correction module, may be passed back to the image acquisition module to provide feedback that informs adjustment of acquisition parameters. For instance, adjusting focus of the camera so as to optimize the sharpness of the enhanced subject image.

HDR Image Composition Module

The goal of the HDR Image Composition Module is twofold:

First, this module seeks to combine subject-enhanced images with traditionally-exposed images so as to provide an overall view of a scene that places the subject in context. For example, a traditionally-exposed view of an automobile may be overlaid with a subject-enhanced view of a passenger in that automobile. This image fusion may be done through a combination with the original, unprocessed image, or in a preferred embodiment, may be done through a combination of the subject-enhanced image with the 'true background' image and/or the 'reflection background' image.

Figure 10:
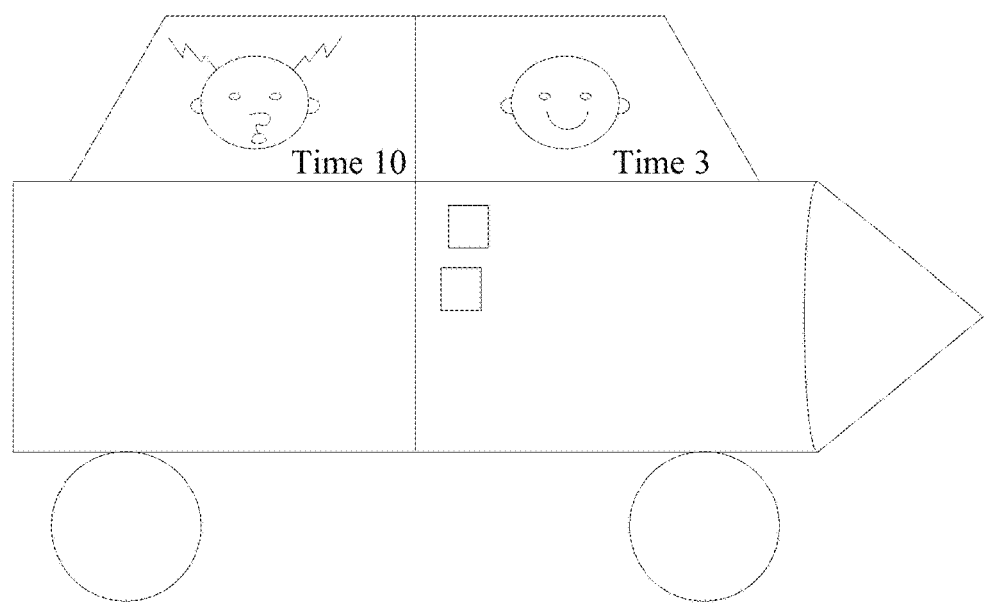
FIG. 10 shows subject images may be captured at different points in time

Second, this module seeks to combine different enhanced-subject images. These different enhanced-subject images may be taken at the same moment in time, but have different degrees of level-shifting and amplification. For instance, an image of a passenger in a vehicle may have very different lighting and require a different level of enhancement processing than an image of the driver of the vehicle. Treating these subject images separately for enhancement purposes, and then fusing the most visible aspects into a single composite HDR image, is the goal of the HDR module. Advantageously, the subject images may be captured at different points in time, as illustrated in FIG. 10. For instance, if two occupants of a vehicle sit still for an extended period of time, they will begin to be considered to be 'background' light. If the driver of the vehicle then starts moving and turns their head towards the camera at time 3, they will create a subject image that is highly visible relative to the background. If the rear seat passenger then turns their head at time 10, they will create a similarly highly visible image. By merging together the images from time 3 and time 10, together with a traditionally exposed image of the vehicle, a composite view of the vehicle and its occupants is produced.

Many techniques for performing HDR image fusion and tonal mapping continuity are available in the machine vision literature. Most are based on optimizing the contrast of the image, combining images taken under different exposure conditions. Some recent work has focused on HDR in video images, primarily from the perspective of ensuring continuity of the HDR merging process across multiple frames, so as to avoid 'blinking' or 'flashes' introduced by changes in HDR mapping decisions from frame to frame. We are not aware of any work that teaches optimization of the HDR image tonal-mapping process based on motion of a subject relative to its background image.

This invention proposes that focusing the HDR tonal-mapping decisions on the subject image, as identified relative to the 'true background' image and the 'reflective background' image, can dramatically improve the quality of the HDR merging process by focusing the limited available intensity levels on the subject itself. Towards this end, sharing the 'true background' image and the 'reflective background' image, as well as the 'subject image' with the HDR compositing module can be beneficial, providing information that may be used to weight the decisions made by the HDR composition module. For instance, in places where the difference between the subject image intensity and the background image intensity are quite large in a region, the HDR image should weight the tonal mapping in favor of representing intensity gradients in the subject image accurately, even at the cost of under-representing intensity gradients in the background image or reflection image. Spatial smoothing of tonal mapping parameters, temporal smoothing of tonal mapping parameters, and the many approaches to seamless integration of multiple images to form an HDR image may be employed to combine multiple subject-enhanced image with traditionally-exposed images or background images.

FIG. 10 illustrates the benefits of image compositing. At time 3, the person in the front seat turns their head, creating temporal intensity change that makes the front seat subject image highly visible. At time 10, the person in the rear seat turns their head, making them highly visible. Compositing the front seat portion of time 3 with the rear seat portion of time 10 creates a composite image that provides an informative view of the overall scene by overlaying multiple subject images with the traditionally-acquired image of the vehicle itself.

Light Segmentation Challenges

The light segmentation module seeks to associate the light in an image into three broad categories:
  a. Light associated with the subject (the 'subject' image).
  b. Light associated with the background behind the subject, which gets occluded as the subject moves around (the 'true background' image).
  c. Light associated with other sources, including reflections on windows, glare on the camera lens, and so forth. (the 'reflection background' image). This 'reflection background' light typically will impact both the camera's view of the subject and the camera's view of the 'true background' as the subject moves around.

In an idealized situation, one will find a way to uniquely identify the light at each pixel that is due to the subject of interest, effectively isolating the light associated with the 'subject' category from the light associated with the 'true background' and 'reflection background' categories of light. In practice, the background and reflection light introduces ambiguity, as does noise, such that many interpretations of which light is to be associated with which category are possible.

Figure 11:
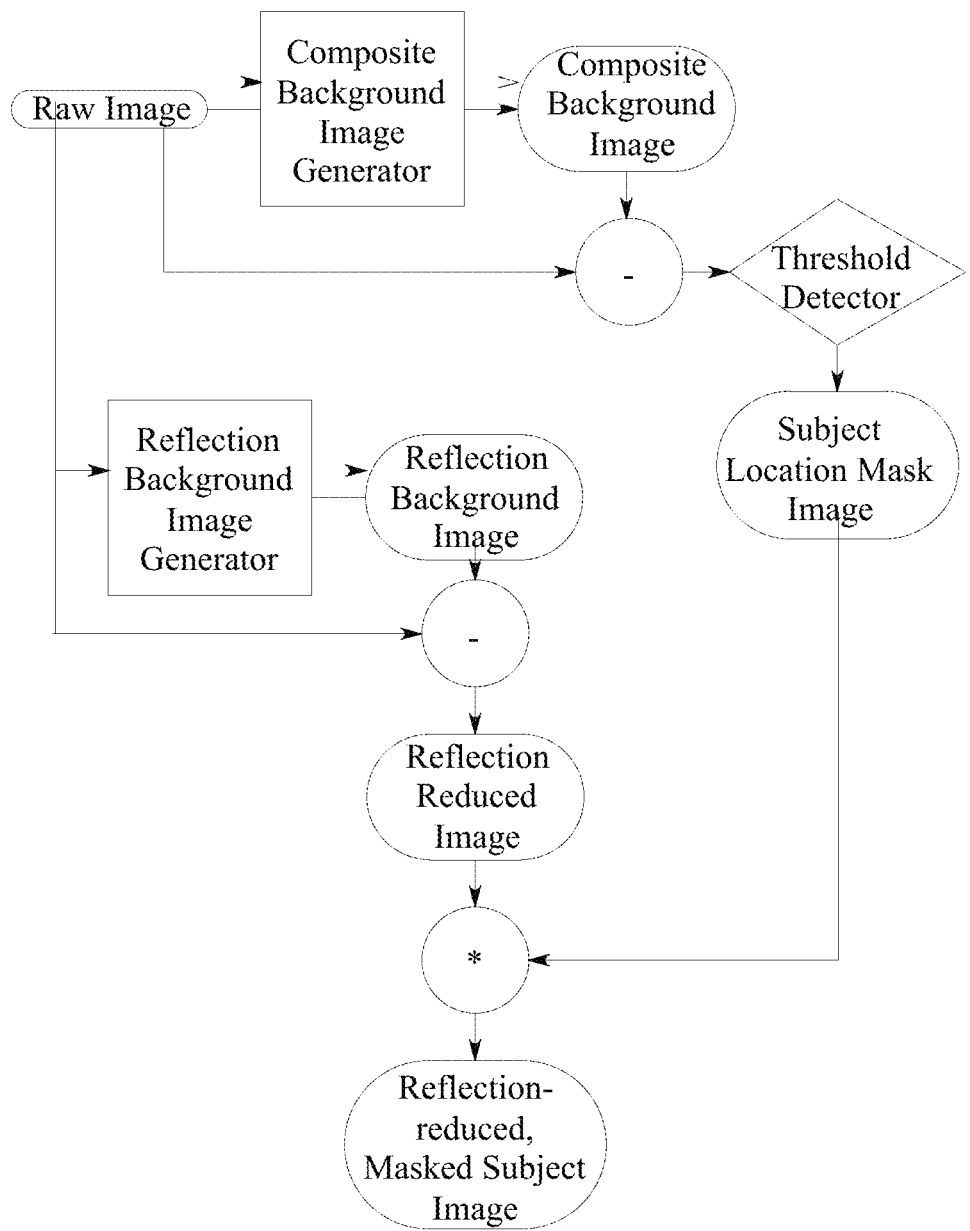
FIG. 11 shows a layer-separation data flow diagram.

There are many demonstrations of transparent layer separation techniques described in the literature. In situations where existing layer-separation techniques may be applied, they may be advantageously utilized with this invention in conjunction with the data flow diagram illustrated in FIG. 11. However, for the most part the existing layer-separation techniques require parametric tracking of motion and hence are limited to specific well-controlled imaging conditions, such as 2-dimensional rigid-body motion with constant velocity. While these techniques may be advantageously employed with this invention, there is a need for a new approach to layer segmentation that is robust to real-world conditions in which subjects rotate to change their profile, flex, bend, and move in and out of shadows in 3-dimensions.

Transparent Layer Segmentation: A New Approach

This invention proposes a new approach to semi-transparent layer separation:
  Create a 'composite background' image model. The 'composite background' includes light from both the 'reflection background' and light from the 'true background'.
  Create a 'reflection background' image model.
  Identify the location of the subject by comparing the current frame to the composite background.
  Create the subject image by isolating the pixels/regions of the current frame that contain the subject, and subtracting from those the 'reflection background' image values for those pixels/regions.
  Note that the 'true background' image does not need to be explicitly created, as it may be derived by subtracting the 'reflection background' image from the 'composite background' image.

Preferred Embodiment: Composite Background Image Generation

Consider a situation such as someone turning their head while sitting in a vehicle, in which the subject is moving around and/or rotating to provide a different profile view that has different coloration and intensity than the original view. The subject is neither translating nor rotating in the 2-D plane, so there is no 2-D parametric motion to model, ruling out the use of most of the transparent layer segmentation approaches in the literature. Yet there is a change in intensity values and colors as the person turns their head, evocative of that which can be detected by certain types of background/foreground separation algorithms.

Traditionally, foreground/background separation is used to identify regions of an image that correspond to a 'foreground' object that occludes a background. For instance, a person walking in front of a mural painted on a wall would be the foreground, while the mural on the wall would be the background. There are many techniques known in the literature for creating a background image from multiple frames of a video. For instance, background/foreground separation algorithms such as those described in [Das and Saharia] may be used to separate the moving parts of an image from the non-moving parts.

Many background/foreground separation algorithms require that a particular pixel be either 'background' or 'foreground', and hence are not suitable for use in situations involving transparency, where a portion of the light at each pixel is 'background' and a portion is 'foreground'. However, we have found that some background/foreground separation algorithms, such as the temporal median filter approach described by [Shoushtarian and Ghasem], can be extended to operate in the presence of transparency, producing a foreground image that consists of the 'subject' image mixed with the 'reflection background' image, and a background image that consists of the 'true background' image mixed with the 'reflection background' image.

In the case of a subject that is viewed through a tinted window, background/foreground separation actually produces a 'composite background image' that includes the 'true background image' that lies behind the subject and is occluded by it, overlaid with light from the 'reflection background image' that arises due to window color illumination, and surface reflections. For instance, in the automobile example, a 'reflection background image' consists of the grey-colored windshield as well as gradients due to selective illumination of the windshield (such as shadows) and reflective illumination of the windshield, such as an image of the sky and clouds. In a simplified model, the image captured by the camera consists of the non-occluded portions of the 'true background image', as well as the 'reflection background image' and the 'subject image'.

In a preferred embodiment, we have found that for outdoor scenes of people in vehicles with tinted windows, the time-weighted averaging filter shown below works well for 'composite background' image generation, creating a weighted average in which more recent video frames are counted more heavily than older video frames:

```
if frameNumber == 1
    backgroundImage = videoFrame;
else
    backgroundImage = ((backgroundImage) * (1.0 - updateFactor) +
        (videoFrame .* updateFactor));
end
where updatefactor = 1.0/60.0 for a 30fps movie.
```

Taking a time-weighted average of multiple frames of a video creates a 'background image' that represents the aspects of the scene that many frames have in common. Objects that are present in any given location for only a short time, because their intensity values are represented only briefly, will be 'averaged out' of the image over time.

Preferred Embodiment: Subject Location Determination

In situations where the subject is the only object in the scene that is moving, background/foreground separation techniques may be employed to identify which pixels/regions regions of an image include light from the subject. For instance, the magnitude of the difference between the current frame and the 'composite background' image may be thresholded, with any value that exceeds the threshold being considered to contain light from the subject.

The Reflection Background Image: Why it is Needed

The foreground image produced by background/foreground separation is sufficient for detecting the location of the subject, but is not sufficient to distinguish between light from the subject and light from the 'reflection background'. Thus when isolating light from the subject via background subtraction techniques, the background subtraction process encounters significant challenges if the entire 'composite background' image produced by foreground/background segmentation is utilized for subtractive processing, rather than only the 'reflection background' image. Hence a method to obtain the 'reflection background' image is needed.

Figure 12:
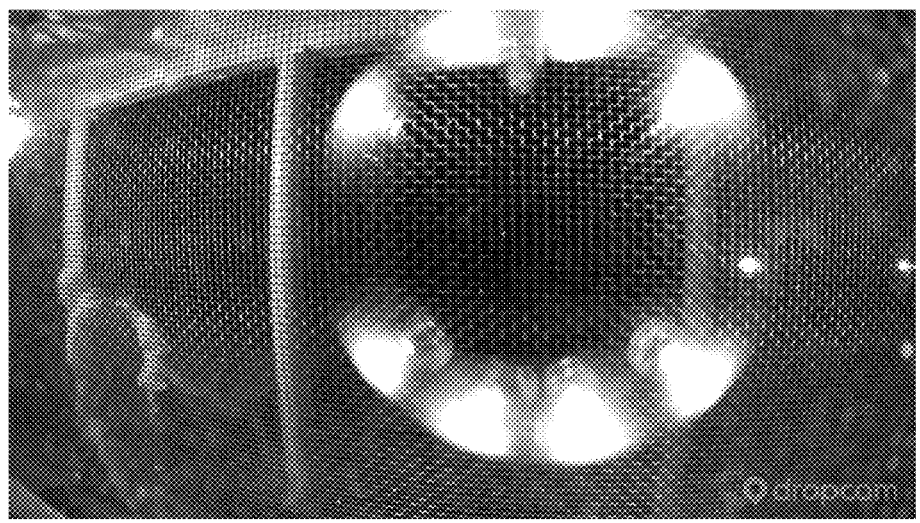
FIG. 12 shows an image captured using a 'Dropcam Pro' video camera.
Figure 13:
FIG. 13 shows an enhanced-Subject frame created via image subtraction a 'Composite Background' image.

Consider the image in FIG. 12, which was captured using a 'Dropcam Pro' video camera mounted indoors, operating in night mode, through a glass window and mesh screen. Note that a person is standing in front of a well-lit architectural column. FIG. 13 shows the result of applying background image subtraction using the full 'composite background' image generated by the weighted-averaging background generation approach described above. Since the 'composite background' which was subtracted includes both the 'reflection background' as well as the 'true background', this approach was successful at eliminating 'reflection background' elements such as the LED reflections. However, it also removed 'true background' elements such as the architectural column. Since this element was lit more brightly than the subject itself, and this difference was in turn amplified, it led to a 'black hole' in the enhanced-subject image, unacceptably obscuring a significant portion of the subject.

Mathematically:

Foreground Image=Subject+Reflection

Composite Background Image=True Background+ Reflection

Performing Background Subtraction:

Foreground−Composite Background=Subject−True Background≠Subject

So in locations where 'True Background' is brighter than the subject, background subtraction will create a 'black hole' or discoloration. There are certain special situations where subtraction of the 'composite background' is sufficient. For example, in a well-controlled lighting situation in which the subject is located in front of a black background, it is sufficient to subtract the composite background, since the 'true background' will be 0 (black). Similarly, in the case of relatively stationary objects, in which one is amplifying a color change rather than a background-exposing motion, such as in the pulse rate detection scenario of the "Eulerian Video Amplification" work, depending on lighting conditions it can be practical to utilize the composite background for background subtraction. However, in most real-world situations, there is light behind the subject, and it is highly desirable to perform background subtraction using only the 'reflection background' portion of the light rather than using the full 'composite background' that is generated by foreground/background separation techniques.

When used with the 'reflection background' image, background subtraction will yield:

Foreground Image=Subject+Reflection

Reflection Background Image=Reflection

Performing Background Subtraction:

Foreground−Reflection Background=Subject

Figure 14:
FIG. 14 shows an enhanced-Subject frame created via image subtraction of a 'Reflection Background.'

FIG. 14 shows the result of applying background image subtraction using only the 'reflection background' image, generated using the technique described below. Note how the subject is visible, even in the presence of the well-lit architectural column.

Use of the 'reflection background' for background subtraction prior to image amplification/and tone mapping is a key novel aspect of this invention.

Thus there is an unmet need for a way to identify the 'reflection background' image independently of the 'composite background' image.

Preferred Embodiment: Reflection Background Image Generation

A key insight of this invention is that in the absence of noise, for a stationary camera, with the subject being the only object moving, the reflection background may be distinguished from the composite background by examining the set of minimum image intensities at each image location, for each spectral band (for instance, Red, Green, and Blue), that all frames (both foreground and background) have in common. Since both the subject image and the composite background image are acquired through the semi-transparent layer, any reflected light from that layer will be included in both the subject and in the composite background image. Thus in the absence of noise, one can estimate the reflection background by taking the minimum value of each spectral component of each pixel/region across multiple image frames.

For example, consider a subject and background that has significant color and/or intensity variation, such as a subject that contains a dark black patch. At all points where the subject is present, the 'true background' will be occluded. At the location of the dark black patch, there will be minimal light from the subject itself, and the only light remaining at that dark spot will be light associated with the window, such as illuminated reflections and coloration, i.e. elements of the 'reflection background image'. As the subject moves around, blocking the 'true background' at different spatial locations, the model of the 'reflection background image' improves over time.

One skilled in the art can envision application of noise reduction approaches to make the reflection background estimate more accurate and robust to noise. These techniques include multi-level spatial scaling, weighted averaging of multiple pixels, time-based filtering of intensity values at each pixel or spatial region, and related techniques described in the image noise-reduction literature For example, the value of each pixel may be temporally averaged over 3 temporal frames prior to using it as the new basis for the 'reflection background image' minimum-value computation, and each pixel value may be averaged with its neighbors in a spatially-weighted manner. Noise filtering is desirable because it helps prevent the occasional 'black' noise pixel from progressively transitioning the computed 'reflection background image' to black.

In practice, the 'Reflection background' does change over time. For instance, the sun may emerge from behind a cloud, or a tree reflected in an automobile window may have its leaves blowing in the breeze from time to time as a gust of wind comes along, causing the amount of reflection light present at each pixel to vary over time. Fortunately, in many real-world imaging situations, the rate of change of the 'reflection background' and the 'true background' is far different from the rate of change of the subject image. This permits a differential spatio-temporal filtering approach to be used to differentiate the 'reflection background' light from the 'true background' and the 'subject' light, similar to the approach used to generate the 'composite background' image.

To account for changing reflection background, in a preferred embodiment an asymmetry is introduced into the weighted averaging formula, causing pixels that are lower in intensity than the 'reflection background' image to be weighted more heavily than pixels that are of greater intensity. In other words, elements of the 'reflection background' image grow brighter slowly, requiring multiple repeated frames to cause change, but grow dimmer more quickly. This allows the reflection background image to approximate the minimum value of recent frames, responding promptly to the learning's available from motion of the subject, while still permitting the reflection background Image to grow slowly in response to sustained changes.

Referring to the weighted averaging formula:

```
if frameNumber == 1
    reflectionBackgroundImage = videoFrame;
else
For each pixel:
    if videoFrame(pixel) > reflectionBackgroundImage(pixel)
        reflectionBackgroundImage(pixel) =
            reflectionBackgroundImage(pixel) * (1.0 - slowUpdateFactor) +
            videoFrame(pixel) * slowUpdateFactor;
        else
        reflectionBackgroundImage(pixel) =
            reflectionBackgroundImage(pixel) * (1.0 - fastUpdateFactor) +
            videoFrame(pixel) * fastUpdateFactor;
end
where slowUpdateFactor is typically <= the composite background update factor
and
fastUpdateFactor is typically much larger, perhaps 1/2 for a 30 fps video.
```

An alternative embodiment would be to keep a history of recent frames, on a time scale of several seconds, and set the reflection background image to reflect the minimum values of each pixel within those frames. Many alternative embodiments are possible, such as those that incorporate spatio-temporal noise filtering prior to performing the minimum calculation, as well as techniques commonly used for noise reduction such as undersubtraction and oversubtraction based on the variance of the quantity being de-noised.

Unlike systems that identify one portion of an image (certain pixels) as being a subject of interest (foreground) and removing an identified background (removing data from other pixels), the systems in accordance with embodiments of the present invention permit background and reflection images to be effectively removed from the same portion of the overall image in which the subject of interest is present.

Figure 15:
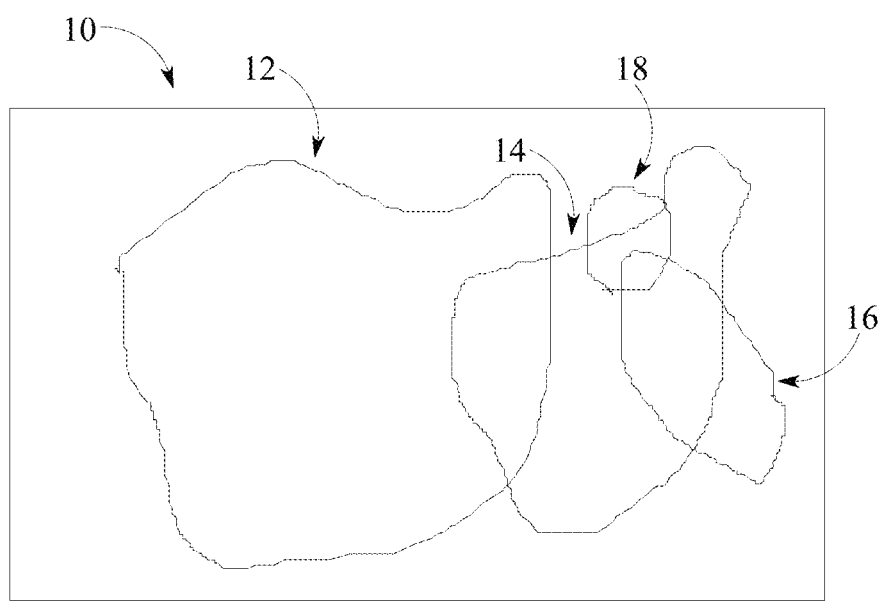
FIG. 15 shows that an image with background elements, slow and fast moving reflection elements.

FIG. 15 shows that an image 10 may include background elements 12, slow moving reflection elements 14 and faster moving reflective elements 16 as well as elements of the image that include the subject of interest 18.

As may be seen in FIG. 15, the subject of interest may have slow moving reflective image components 14 as well as faster moving reflective image components 16 overlying part or all of the part of the image that includes the subject of interest 18.

The system then selectively amplifies the image components to reduce the background and reflective portions, and to enhance the subject of interest.

As discussed above, a combination of level shifting, further amplification and tone correction is then employed to bring out the subject of interest.

Figure 16:
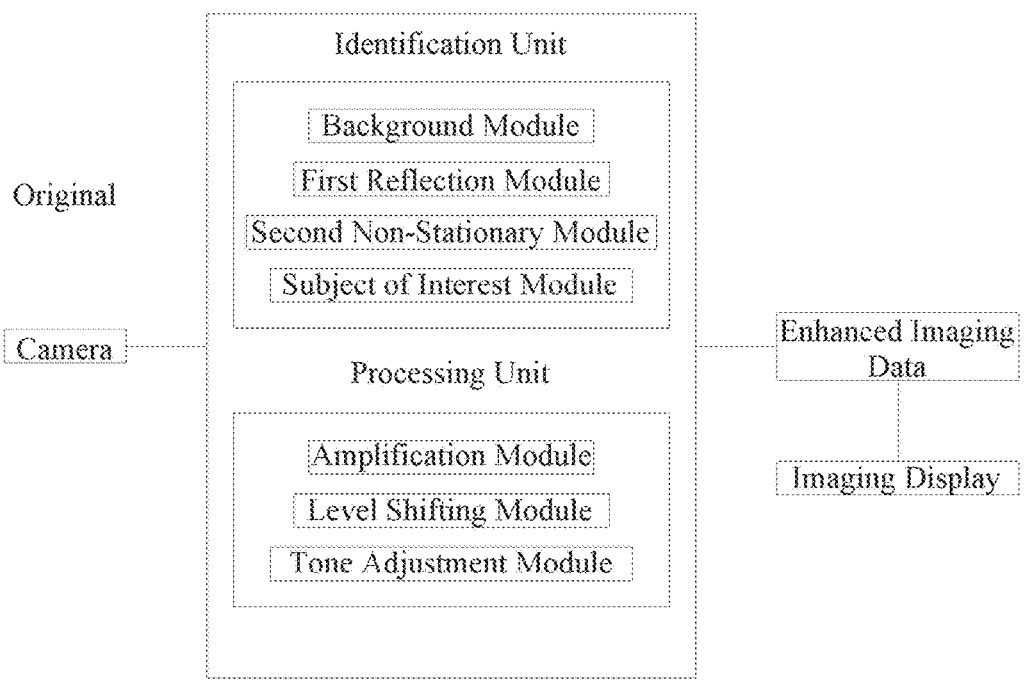
FIG. 16 shows how processing may be done.

As shown, for example, in FIG. 16, the processing may be done by a processing system 20 that receives data regarding an input image 22 from a camera (still or video) 24, and the processing unit 20 provides enhanced image date 26 to an imaging display 28.

The processing system 20 may include an identification unit 30 and a processing unit 32. The identification unit 30 may include a background module 34 for identifying background portions of the original image that include stationary portions of the original image, a first reflection module 36 for identifying first reflective portions of the original image that move slower than a first rate, $r_1$, over a first period of time, a second reflection module 38 for identifying second reflective portions (e.g., non-stationary) of the original image that move faster than a second rate, $r_2$ that is faster than the rate $r_1$ over a second period of time, and a subject of interest module 40 for identifying a subject of interest portion of the original image. At least some of the first reflective portions or the second reflective portions overlay the subject of interest portion. The processing unit 32 may include an amplifier module for selectively amplifying portions of the original image as discussed above, a level shifting unit for level shifting portions of the original image as discussed above, and a tone adjustment module for selectively adjusting the tone of the image to provide the enhanced image of the subject of interest.

Additional Attributes of the Invention

This basic image enhancement approach may be augmented by limiting amplification to a specific area of interest, such as the vehicle windows. This helps to avoid amplifying noise introduced by minor changes in lighting in areas that are not of interest for imaging, such as vehicle trim or bumpers, which also tend to move slightly when the people in a vehicle move. The area of interest may be identified via human input, or via automated object recognition methods. For instance, automatic recognition may be achieved by limiting amplification to objects that have certain geometric features such as nearly-rectangular window shape, color factors (tinted windows tend to have a different color than the adjacent car body), intensity factors (tinted windows tend to be darker or lighter than the surrounding car body), texture, or spatial size/shape of the detected areas of motion. For example, an automated system would reject areas for which the scale of motion detected is too small or too large to originate from the subject of interest.

What is claimed is:

1. A method for generating a high dynamic range composite image including subjects by using motion to distinguish signals of subjects of an image from confounding signals, selectively amplifying the signal associated with each subject comprising the steps of:
identifying background portions of the image;
identifying first reflective portions of the image;
identifying a subject of interest portion of the image, wherein at least some of the first reflective portions overly a subject;
applying selective amplification to at least one of the subject of interest portions, the background portions, or the first reflective portions to provide an enhanced image.

2. The method of claim 1 where tone correction and/or level shifting is applied to the enhanced image.

3. The method of claim 1 where the signals of subjects are taken at different moments in time.

4. The method of claim 1 where the selectively enhanced image is selectively merged with an image is not selectively subject-enhanced.

5. The method of claim 1 where the enhancement is applied to a region surrounding a subject.

6. The method of claim 5 in which the degree of enhancement is gradually reduced with distance from a subject, so as to smoothly blend the enhanced region with the unenhanced region of the image.

7. The method of claim 1, in which range information is used to further inform which light is due to subject of interest vs. confounding light sources.

8. The method of claim 7 in which the range information is used to identify occlusions between a partially-transparent surface and a camera, so that the impact of these temporary occlusions on a model of confounding may be reduced.

9. The method of claim 7 in which the range information is used to restrict the set of image changes that are considered as candidates for inclusion in the 'subject light' category.

10. The method of claim 7 where the range information is derived from a laser rangefinder co-located with the camera, from a focal-plane-array camera or stereoscopic camera, a time of flight camera, synthetic aperture, or other means for determining depth.

11. A method for enhancing the subject of an original image, said method comprising the steps of:
identifying background portions of the original image;
identifying reflective portions of the original image;
identifying a subject of interest portion of the original image, wherein at least some of the reflective portions overlie the subject of interest;
applying selective amplification to the background portions, reflective portions, and the subject of interest portions;
applying level shifting to the subject of interest portions; and
applying tone correction to the subject of interest to provide an enhanced image of the subject of interest.

12. The method of claim 11, wherein said original image is a still image.

13. The method of claim 11, wherein said method further includes the step of adjusting image acquisition parameters of a camera.

14. A method for adjusting an image acquisition parameter, said method comprising the steps of:
a. For a region of an image, estimating the signal from non-subject sources that have been mixed with signal from the subject of the original image
b. Applying selective enhancement to reduce the signal intensity of non-subject portions of the image relative to the signal intensity of subject portions of the image,
c. Computing an image quality metric of the selectively enhanced image,
d. Adjusting an image acquisition parameter and repeating the estimation, enhancement, and quality measurement, to improve the image quality as measured by the metric.

15. The method of claim 14 in which said enhancement involves subtractive processing.

16. The method of claim 15, wherein said subtractive processing is achieved in a manner that accounts for occlusion of a portion of the non-subject signal by the subject.

17. The method of claim 16, wherein identifying the signal of the non-subject portion of the original image is achieved in a manner that comprises creating both an estimate of the reflection background signal and an estimate of the non-reflection background signal.

18. The method of claim 14, wherein the adjustable image acquisition parameter is any of focus, exposure time, illumination intensity, illumination pattern, white balance, aperture size, shutter speed, or frame rate.

19. The method of claim 14, wherein the adjustable image acquisition parameter is a property of the selective enhancement, such as any of amplification gain factor, selectivity time scale, or selectivity spatial scale.

20. The method of claim 14 where the estimation is performed based on data corresponding to multiple signal acquisition geometries.

21. The method of claim 14 where range information is used to identify occlusions between a partially-transparent surface and a camera, so that the impact of these temporary occlusions on the estimation may be reduced.

22. The method of claim 14 where range information is used in estimating the signal.

23. The method of claim 14 where the non-subject signal is estimated based on the minimum values of signal intensity in a region of an image during a time interval of interest.

24. The method of claim 14 where the non-subject signal estimate is generated such that repeated image signals whose intensity is less than the current intensity of the estimate by an amount theta will update the estimate at a faster rate than signals whose intensity is not less than the current intensity of the estimate.

25. The method of claim 24 where theta is approximately 5%.

26. The method of claim 24 where theta=0.

27. The method of claim 24 where theta is adjusted based on statistical properties of the intensity levels in the during a time interval of interest.

28. A system that produces selectively enhanced still or video images, comprising:
    an image acquisition apparatus for obtaining a multi-image sequence of images,
    an image acquisition module, comprised of a processor configured to execute instructions, that operates on the multi-image sequence of images in a manner that permits access to signal intensity data for each region of an image,
    a light segmentation module, comprised of a processor configured to execute instructions, that analyzes the signal intensity data to detect intensity changes in each region of an image over time to estimate the portion of the light present in each region that is associated with a subject of interest,
    a selective amplification module, comprised of a processor configured to execute instructions, that operates on each region in a manner that increases the intensity of the signal associated with the subject of interest relative to the intensity of other signals, producing a selectively-enhanced signal, and
    a HDR Image Composition module, comprised of a processor configured to execute instructions taking the selectively-enhanced signal as an input that produces as an output an enhanced image or image sequence based on the selectively-enhanced signal.

29. The method of claim 14 where the estimate is generated in part by comparison of the current image with a reference image acquired with reflective signal sources turned off or intensity-modulated.

30. The method of claim 14 where the estimate is generated in part by comparison of the current image with a reference image acquired with the lighting of a subject turned off or intensity-modulated.

31. An apparatus for obtaining any source of pixel intensity where the image acquisition parameters of the apparatus are configured to be adjusted according to the claim 14.

32. The apparatus of claim 31, where the pixel intensity is correlated with a physical source of information, and where the image acquisition parameter is any of focus, exposure time, white balance, aperture size, shutter speed, frame rate, illumination intensity, or illumination pattern.

33. The method of claim 28 where the HDR Image Composition module operates by combining regions of multiple images acquired at different times, to create a depiction of multiple subjects that would not otherwise be visible simultaneously.

34. A method for enhancing the subject of an original image, said method comprising the steps of:
    identifying background portions of the original image;
    identifying reflective portions of the original image;
    identifying a subject of interest portion of the original image, wherein at least some of the reflective portions overlie the subject of interest;
    applying selective amplification to the background portions, reflective portions, and the subject of interest portions;
    applying level shifting or tone correction to the subject of interest portions to provide an enhanced image of the subject of interest.

* * * * *